(12) United States Patent
Hong et al.

(10) Patent No.: US 12,548,566 B2
(45) Date of Patent: Feb. 10, 2026

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Jiyoun Hong, Suwon-si (KR); Kyenghun Lee, Suwon-si (KR); Hyeonmok Ko, Suwon-si (KR); Dayoung Kwon, Suwon-si (KR); Jonggu Kim, Suwon-si (KR); Seoha Song, Suwon-si (KR); Eunsik Lee, Suwon-si (KR); Pureum Jung, Suwon-si (KR); Changho Paeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 18/221,676

(22) Filed: Jul. 13, 2023

(65) Prior Publication Data

US 2023/0360648 A1    Nov. 9, 2023

Related U.S. Application Data

(63) Continuation of application No. PCT/KR2023/000026, filed on Jan. 2, 2023.

(30) Foreign Application Priority Data

Jan. 3, 2022   (KR) .................. 10-2022-0000559

(51) Int. Cl.
| | | |
|---|---|---|
| *G10L 15/22* | (2006.01) | |
| *G10L 15/18* | (2013.01) | |
| *G10L 15/26* | (2006.01) | |

(52) U.S. Cl.
CPC .............. *G10L 15/22* (2013.01); *G10L 15/18* (2013.01); *G10L 15/26* (2013.01)

(58) Field of Classification Search
CPC ........ G06F 16/248; G10L 15/22; G10L 15/26
See application file for complete search history.

(56) References Cited

U.S. PATENT DOCUMENTS

| | | |
|---|---|---|
| 8,126,456 B2 | 2/2012 | Lotter et al. |
| 9,858,925 B2 | 1/2018 | Gruber et al. |

(Continued)

FOREIGN PATENT DOCUMENTS

| | | |
|---|---|---|
| JP | 2016-126294 A | 7/2016 |
| JP | 2018-180409 A | 11/2018 |

(Continued)

OTHER PUBLICATIONS

Written Opinion (PCT/ISA/237) issued Apr. 11, 2023 from the International Searching Authority in International Application No. PCT/KR2023/000026.

(Continued)

*Primary Examiner* — Daniel Abebe
(74) *Attorney, Agent, or Firm* — Sughrue Mion, PLLC

(57) ABSTRACT

An electronic device includes a microphone, a memory, and a processor configured to obtain a first natural language understanding result for a first user voice obtained through the microphone based on a first text corresponding to the first user voice, provide a first response corresponding to the first user voice based on the first natural language understanding result, identify whether the first user voice includes a tracking element based on the first natural language understanding result and a second text corresponding to the first response, based on identifying that the first user voice includes the tracking element, store the first text, the first natural language understanding result and the second text in (Continued)

the memory, and obtain a third text corresponding to the first response based on the first natural language understanding result.

20 Claims, 14 Drawing Sheets

(56) References Cited

U.S. PATENT DOCUMENTS

| | | | |
|---|---|---|---|
| 9,959,129 | B2 | 5/2018 | Kannan et al. |
| 10,102,844 | B1* | 10/2018 | Mois ................ G06F 16/3329 |
| 10,880,378 | B2 | 12/2020 | VanBlon et al. |
| 11,302,319 | B2 | 4/2022 | Jang et al. |
| 11,314,481 | B2 | 4/2022 | Wang et al. |
| 11,501,755 | B2 | 11/2022 | Hwang |
| 11,837,215 | B1* | 12/2023 | Srivatsa ................ G10L 15/22 |
| 11,966,701 | B2* | 4/2024 | Pu ............................ G06T 19/20 |
| 2012/0265528 | A1 | 10/2012 | Gruber et al. |
| 2013/0346396 | A1* | 12/2013 | Stamm ............... G06F 16/9535 707/722 |
| 2016/0203002 | A1 | 7/2016 | Kannan et al. |
| 2018/0144055 | A1 | 5/2018 | Wu |
| 2019/0180747 | A1 | 6/2019 | Back et al. |
| 2020/0005784 | A1 | 1/2020 | Vadackupurath Mani et al. |
| 2020/0111490 | A1 | 4/2020 | Jang et al. |
| 2021/0026593 | A1 | 1/2021 | Wang et al. |
| 2021/0050006 | A1 | 2/2021 | Andreas et al. |
| 2021/0065685 | A1 | 3/2021 | Hwang |
| 2021/0097999 | A1 | 4/2021 | Gao et al. |
| 2021/0166678 | A1 | 6/2021 | Lee et al. |
| 2021/0375286 | A1 | 12/2021 | Choudhury et al. |
| 2022/0244910 | A1 | 8/2022 | Wang et al. |
| 2022/0270605 | A1 | 8/2022 | Jang et al. |
| 2022/0375467 | A1 | 11/2022 | Jin et al. |

FOREIGN PATENT DOCUMENTS

| | | | |
|---|---|---|---|
| KR | 10-2020-0044175 A | 4/2009 | |
| KR | 10-2013-0012240 A | 2/2013 | |
| KR | 10-2019-0067638 A | 6/2019 | |
| KR | 10-2019-0142219 A | 12/2019 | |
| KR | 10-2021-0026962 A | 3/2021 | |
| KR | 10-2021-0066651 A | 6/2021 | |
| KR | 10-2447546 B1 | 9/2022 | |
| KR | 10-2490776 B1 | 1/2023 | |
| KR | 10-2520068 B1 | 4/2023 | |
| WO | WO-2013192584 A1 * | 12/2013 | ....... G06F 17/30554 |
| WO | 2022/234930 A1 | 11/2022 | |

OTHER PUBLICATIONS

International Search Report (PCT/ISA/210) issued Apr. 11, 2023 from the International Searching Authority in International Application No. PCT/KR2023/000026.
Extended European Search Report issued on Nov. 11, 2024 by the European Patent Office for European Patent Application No. 23735153.1.
Communication dated Jul. 2, 2025, issued by the European Patent Office in counterpart European Application No. 23735153.1.
Communication issued Nov. 21, 2025 by the European Patent Office in European Patent Application No. 25204456.5.

* cited by examiner

ELECTRONIC DEVICE AND METHOD FOR CONTROLLING ELECTRONIC DEVICE

CROSS-REFERENCE TO RELATED APPLICATIONS

This application is a bypass continuation of International Application No. PCT/KR2023/000026, filed on Jan. 2, 2023, which is based on and claims priority to Korean Patent Application No. 10-2022-0000559 filed on Jan. 3, 2022 in the Korean Intellectual Property Office, the disclosures of which are incorporated by reference herein in their entireties.

BACKGROUND

1. Field

The disclosure relates to an electronic device and a method for controlling an electronic device, and more particularly, to an electronic device for providing response information to the user voice, and a method for controlling an electronic device.

2. Description of Related Art

In recent, artificial intelligence (AI) assistant technology has been developed with developments of AI technology and deep learning technology, and most electronic devices, including a smartphone, may provide an AI assistant program or service. In particular, with development of voice identification technology, the AI assistant service has been recently developed into an interactive type such as a user communicating with the electronic device from a chatter type such as a conventional chatter robot. The interactive-type AI assistant service may provide a response immediately after obtaining a user voice, and a user may thus receive information quickly. In addition, the interactive-type AI assistant service may provide the user with the same effect as the user communicating with the electronic device, thus expanding user intimacy and accessibility to the electronic device.

However, despite the development of the AI assistant technology, there is still a limitation in that the AI assistant is operated only in case of obtaining an input such as the user voice from the user. In particular, in relation to the response provided based on a user request through the AI assistant, this limitation may lead to a problem that the user fails to receive the related information even in case that specific information is changed, and thus ultimately fails to recognize that the specific information is changed. That is, unless the user inputs the user voice related to the specific information, the user may fail to recognize that the specific information is changed. Therefore, even after the AI assistant provides the response to the user, it may be necessary to continuously verify whether the provided response is appropriate, and in case that the provided response is identified as inappropriate, it is necessary to actively provide an appropriate response even in case of not obtaining the user voice.

SUMMARY

According to an aspect of the disclosure, an electronic device may include a microphone, a memory, and a processor configured to obtain a first natural language understanding result for a first user voice obtained through the microphone based on a first text corresponding to the first user voice, provide a first response corresponding to the first user voice based on the first natural language understanding result, identify whether the first user voice includes a tracking element based on the first natural language understanding result and a second text corresponding to the first response, based on identifying that the first user voice includes the tracking element, store the first text, the first natural language understanding result and the second text in the memory, obtain a third text corresponding to the first response based on the first natural language understanding result, identify whether a changed element from the second text is included in the third text by comparing the second text with the third text, and based on identifying that the changed element is included in the third text, provide a second response corresponding to the first user voice and based on the third text.

The processor may be further configured to identify that the first user voice includes the tracking element based on a user intention included in the first user voice being to request information that is to be changed over time. The processor may be further configured to provide the first response by requesting a server to conduct a search corresponding to the first user voice, and identify that the first user voice includes the tracking element based on a search result obtained from the server.

The processor may be further configured to identify whether the first user voice includes time information based on the first natural language understanding result, and based on identifying that the first user voice includes the time information, obtain the third text until a time point corresponding to the time information after the first response is provided.

The processor may be further configured to obtain a second natural language understanding result for the second text and a third natural language understanding result for the third text by inputting the second text and the third text to a natural language understanding model, and identify whether the changed element is included in the third text based on the obtained second natural language understanding result and the third natural language understanding result.

The processor may be further configured to identify whether a context of a user that produces the first user voice corresponds to the third text at a time point when the first response is provided, and based on identifying that the context of the user corresponds to the third text at the time point when the first response is provided, provide the second response based on the third text.

The processor may be further configured to, based on identifying that the context of the user that produces the first user voice does not correspond to the third text, identify whether a second user voice of the user related to the first user voice is included in history information, the history information including information on the first user voice, information on the second user voice, and responses respectively corresponding to the first user voice and the second user voice, and based on identifying that the second user voice is included in the history information, provide the second response based on the third text.

According to an aspect of the disclosure, a method for controlling an electronic device may include obtaining a first natural language understanding result for a first user voice based on a first text corresponding to the first user voice, providing a first response corresponding to the first user voice based on the first natural language understanding result, identifying whether the first user voice includes a tracking element based on the first natural language understanding result and a second text corresponding to the first response, based on identifying that the first user voice includes the tracking element, storing the first text, the first natural language understanding result and the second text, obtaining a third text corresponding to the first response based on the first natural language understanding result, identifying whether a changed element from the second text is included in the third text by comparing the second text with the third text, and based on identifying that the changed element is included in the third text, providing a second response corresponding to the first user voice and based on the third text.

Identifying whether the first user voice may include the tracking element includes identifying that a user intention included in the first user voice is to request information that is to be changed over time.

Identifying whether the first user voice includes the tracking element further includes may include requesting a server to search for the first user voice, and identifying that the first user voice includes the tracking element based a search result obtained from the server.

Obtaining the third text may include identifying whether the first user voice includes time information based on the first natural language understanding result, and based on identifying that the first user voice includes the time information, obtaining the third text until a time point corresponding to the time information after the first response is provided.

Identifying whether the changed element from the second text is included in the third text may include obtaining, a second natural language understanding result for the second text and a third natural language understanding result for the third text, and identifying whether the changed element is included in the third text based on the second natural language understanding result and the third natural language understanding result.

Providing the second response based on the third text may include identifying whether a context of a user that produces the first user voice corresponds to the third text at a time point when the first response is provided, and the method may further include, based on identifying that the context of the user corresponds to the third text at the time point when the first response is provided, providing the second response based on the third text.

Providing the second responds based on the third text may include based on identifying that the context of the user that produces the first user voice does not correspond to the third text, identifying whether a second user voice of the user related to the first user voice is included in history information, the history information including information on the first user voice, information on the second user voice, and information on responses respectively corresponding to the first user voice and the second user voice, and based on identifying that the second user voice is included in the history information, provide the second response based on the third text.

According to an aspect of the disclosure, a non-transitory computer-readable storage medium may store instructions that, when executed by at least one processor, cause the at least one processor to obtain a first natural language understanding result for a first user voice obtained through a microphone based on a first text corresponding to the first user voice, provide a first response corresponding to the first user voice based on the first natural language understanding result, obtain a third text corresponding to the first response based on the first natural language understanding result, identify whether a changed element from a second text is included in the third text by comparing the second text with the third text, and based on identifying that the changed element is included in the third text, provide a second response corresponding to the first user voice and based on the third text.

The instructions, when executed, may further cause the at least one processor to identify that the first user voice includes a tracking element based on a user intention included in the first user voice being to request information that is to be changed over time.

The instructions, when executed, may further cause the at least one processor to provide the first response by requesting a server to conduct a search corresponding to the first user voice, and identify that the first user voice includes the tracking element based on a search result obtained from the server.

The instructions, when executed, may further cause the at least one processor to identify whether the first user voice includes time information based on the first natural language understanding result, and based on identifying that the first user voice includes the time information, obtain the third text until a time point corresponding to the time information after the first response is provided.

The instructions, when executed, may further cause the at least one processor to obtain a second natural language understanding result for the second text and a third natural language understanding result for the third text by inputting the second text and the third text to a natural language understanding model, and identify whether the changed element is included in the third text based on the obtained second natural language understanding result and the third natural language understanding result.

The instructions, when executed, may further cause the at least one processor to identify whether a context of a user that produces the first user voice corresponds to the third text at a time point when the first response is provided, and based on identifying that the context of the user corresponds to the third text at the time point when the first response is provided, provide the second response based on the third text.

DETAILED DESCRIPTION

General terms that are currently widely used were selected as terms used in embodiments of the disclosure in consideration of functions in the disclosure, but may be changed depending on the intention of those skilled in the art or a judicial precedent, the emergence of a new technique and the like. In addition, in a specific case, terms arbitrarily chosen by an applicant may exist. In this case, the meanings of such terms are mentioned in detail in corresponding description portions of the disclosure. Therefore, the terms used in the embodiments of the disclosure need to be defined on the basis of the meanings of the terms and the contents throughout the disclosure rather than simple names of the terms.

In the disclosure, an expression "have," "may have," "include," "may include" or the like, indicates presence of a corresponding feature (for example, a numerical value, a function, an operation, a component such as a part or the like), and does not exclude presence of an additional feature.

In the specification, "A or/and B" may indicate either "A or B," or "both of A and B."

Expressions "first," "second" or the like, used in the disclosure may indicate various components regardless of a sequence and/or importance of the components. These expressions are used only in order to distinguish one component from the other components, and do not limit the corresponding components.

In case that any component (for example, a first component) is mentioned to be "(operatively or communicatively) coupled with/to or connected to" another component (for example, a second component), it is to be understood that the any component is directly coupled to the another component or may be coupled to the another component through other component (for example, a third component).

Terms of a singular form may include plural forms unless explicitly indicated otherwise. It is further understood that a term "include" or "formed of" used in the specification specifies the presence of features, numerals, steps, operations, components, parts or combinations thereof, which is mentioned in the specification, and does not preclude the presence or addition of one or more other features, numerals, steps, operations, components, parts or combinations thereof.

In the embodiments, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor except for a "module" or a "~er/or" that needs to be implemented by a specific hardware.

Hereinafter, the disclosure is described in detail with reference to the accompanying drawings.

Figure 1:
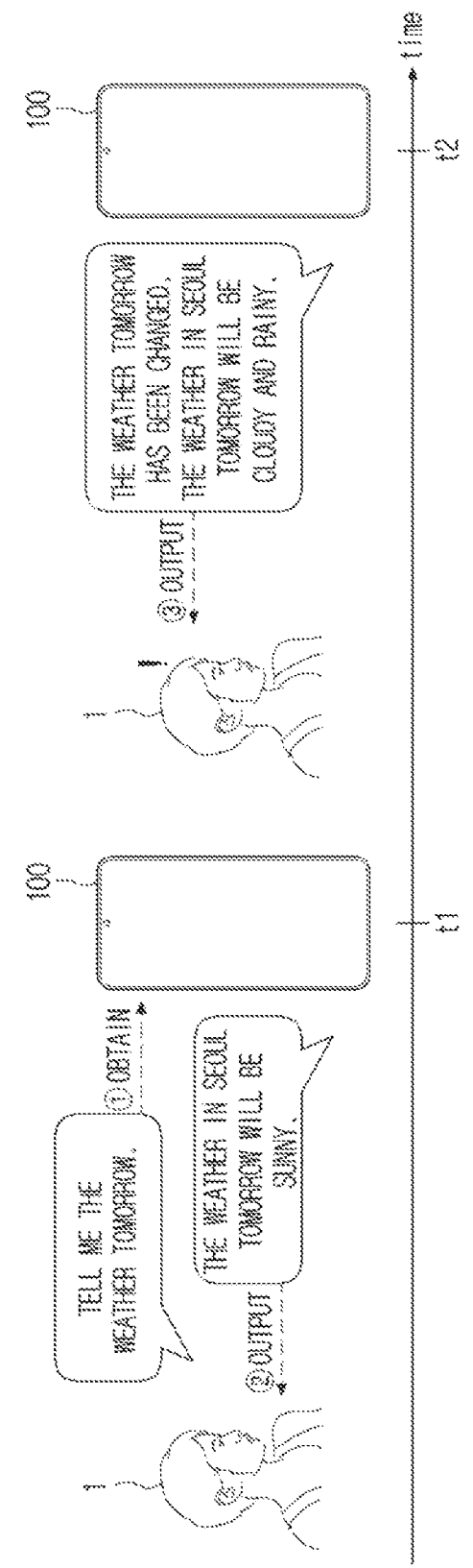
FIG. 1 is an exemplary diagram showing that a response is provided to a user again in case that changed information is included in response information provided to the user according to an embodiment of the disclosure.

FIG. 1 is an exemplary diagram showing that a response is provided to a user again in case that changed information is included in response information provided to the user according to an embodiment of the disclosure.

Artificial intelligence (AI) assistant technology is developed with developments of AI technology and deep learning technology, and most of electronic devices, including a smartphone, may provide an AI assistant program or service. The AI assistant service is developed into an interactive type (e.g., Bixby) that identifies a user voice and then outputs a response corresponding to the user voice as a sound (or message) through a speaker from a conventional chatter type (e.g., chatter robot) that receives a text message from the user and provides a response thereto. The interactive-type AI assistance service may provide the response immediately after obtaining the user voice, and the user may thus receive information quickly. In addition, the interactive-type AI assistant service may provide the user with the same effect as the user communicating with the electronic device 100, thus expanding user intimacy and accessibility to the electronic device 100.

However, most of the electronic devices mounted with such an AI assistant program may provide the response only in case of obtaining the user voice, for example, in case of obtaining the user voice requesting to search for or provide specific information. Accordingly, even though information related to the response on the user voice is changed, the user may not recognize that the information related to the previously provided response is changed unless the user requests the related information to the electronic device again. For example, assume that the user requests tomorrow's weather information through the AI assistant of the electronic device. The electronic device 100 may obtain information of "sunny" in relation to tomorrow's weather, and output a voice saying "The weather tomorrow will be sunny" as a response on the user voice. However, the weather may be changed over time. Even though tomorrow's weather is changed from "sunny" to "cloudy and rainy," the user may recognize that tomorrow's weather is still sunny by the previous response provided from the electronic device 100. That is, unless the user requests "tomorrow's weather information" from the electronic device 100 again, the user may not receive the changed tomorrow's weather information. As described above, this problem may occur because the AI assistant of the electronic device 100 obtains the user voice, performs voice identification for the obtained voice, and is operated based thereon.

In order to solve this problem, according to an embodiment of the disclosure, the AI assistant may continue to search whether there occurs a changed element in relation to the response, even after providing the response to a user 1. In particular, even though the electronic device 100 does not receive a voice from the user 1, the electronic device may verify whether the previously provided response still corresponds to an appropriate response at a current time point. Then, in case that the previously provided response is identified as an inappropriate response at the current time point, the AI assistant may allow the user to recognize that there occurs the changed element in relation to the previous response.

For example, referring to FIG. 1, the user may request tomorrow's weather information through the AI assistant of the electronic device 100 at a time point t1. The electronic device 100 may obtain information of "sunny" in relation to tomorrow's weather, and output the voice saying "The weather in Seoul tomorrow will be sunny" as the response on the user voice. The electronic device 100 may then continuously verify whether the previously provided response "The weather in Seoul tomorrow will be sunny" is appropriate for the current time point, even without obtaining the user voice related to tomorrow's weather. In addition, in case that tomorrow's weather is changed from "sunny" to "cloudy and rainy," the electronic device 100 may provide a response regarding the changed tomorrow's weather even though not obtaining a separate user voice.

Figure 2:
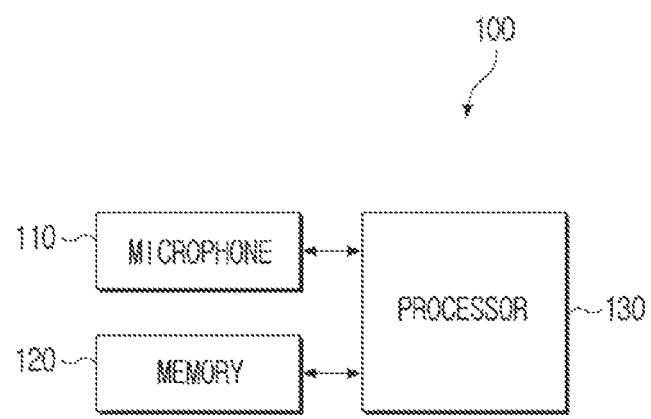
FIG. 2 is a configuration diagram of an electronic device according to an embodiment of the disclosure.

FIG. 2 is a configuration diagram of an electronic device according to an embodiment of the disclosure.

According to an embodiment of the disclosure, the electronic device 100 may include various electronic devices such as a mobile phone, a smartphone, a tablet personal computer (PC), a laptop PC, a computer and a smart television (TV). For example, the electronic device 100 may include an electronic device which may obtain the voice spoken by the user, may perform voice identification for the obtained voice, and may be operated based on a voice identification result.

Referring to FIG. 2, an electronic device 100 according to an embodiment of the disclosure may include a microphone 110, a memory 120 and a processor 130.

According to an embodiment of the disclosure, the microphone 110 may obtain the user voice according to a user speech, and the user voice obtained here may correspond to a control command for controlling an operation of the electronic device 100. The microphone 110 may obtain vibration caused by the user voice, and convert the obtained vibration into an electric signal. To this end, the microphone may include an analog to digital (A/D) converter, and may be operated in conjunction with the A/D converter positioned outside the microphone. At least a portion of the user voice obtained through the microphone 110 may be input to voice identification and natural language understanding models.

In case that the electronic device 100 obtains a trigger input corresponding to the AI assistant, the user voice obtained through the microphone 110 thereafter may be specified as the user voice input to the voice identification and natural language understanding models. Hereinafter, the 'user voice' may be used to refer to the user voice input to the voice identification and natural language understanding models as the user voice obtained through the microphone 110 after the trigger input is obtained.

The microphone 110 may obtain a signal for a sound or voice generated outside the electronic device 100 in addition to the user voice.

The memory 120 may store at least one command related to the electronic device 100. In addition, the memory 120 may store an operating system (O/S) for driving the electronic device 100. In addition, the memory 120 may store various software programs or applications for operating the electronic device 100 according to various embodiments of the disclosure. In detail, the memory 120 may store programs related to the AI assistant, an automatic speech recognition (ASR) model, the natural language understanding (NLU) model, a dialogue manager (DM) module, an execution module and a natural language generator (NLG) module and the like. In addition, the memory 120 may store user history information related to the AI assistant.

The memory 120 may include a semiconductor memory such as a flash memory, or a magnetic storing medium such as a hard disk.

The processor 130 may control an overall operation of the electronic device 100. In detail, the processor 130 may be connected to the components of the electronic device 100 including the microphone 110 and the memory 120 as described above to control the overall operation of the electronic device 100. In this regard, the processor 130 may be implemented in various ways. For example, the processor may be implemented as at least one of an application specific integrated circuit (ASIC), an embedded processor, a microprocessor, a hardware control logic, a hardware finite state machine (FSM) or a digital signal processor (DSP). Meanwhile, in the disclosure, the term the "processor" may be used to include a central processing unit (CPU), a graphic processing unit (GPU) and a main processing unit (MPU).

According to an embodiment of the disclosure, the processor 130 may use the AI assistant system to perform the voice identification for the user voice and provide the response corresponding to the user voice. In this case, the AI assistant system may include an ASR model 210, an NLU model 220, a dialogue manager module 230, an execution module 240 and an NLG model 250. The AI assistant system is described in detail with reference to FIGS. 4 and 5.

Figure 3:
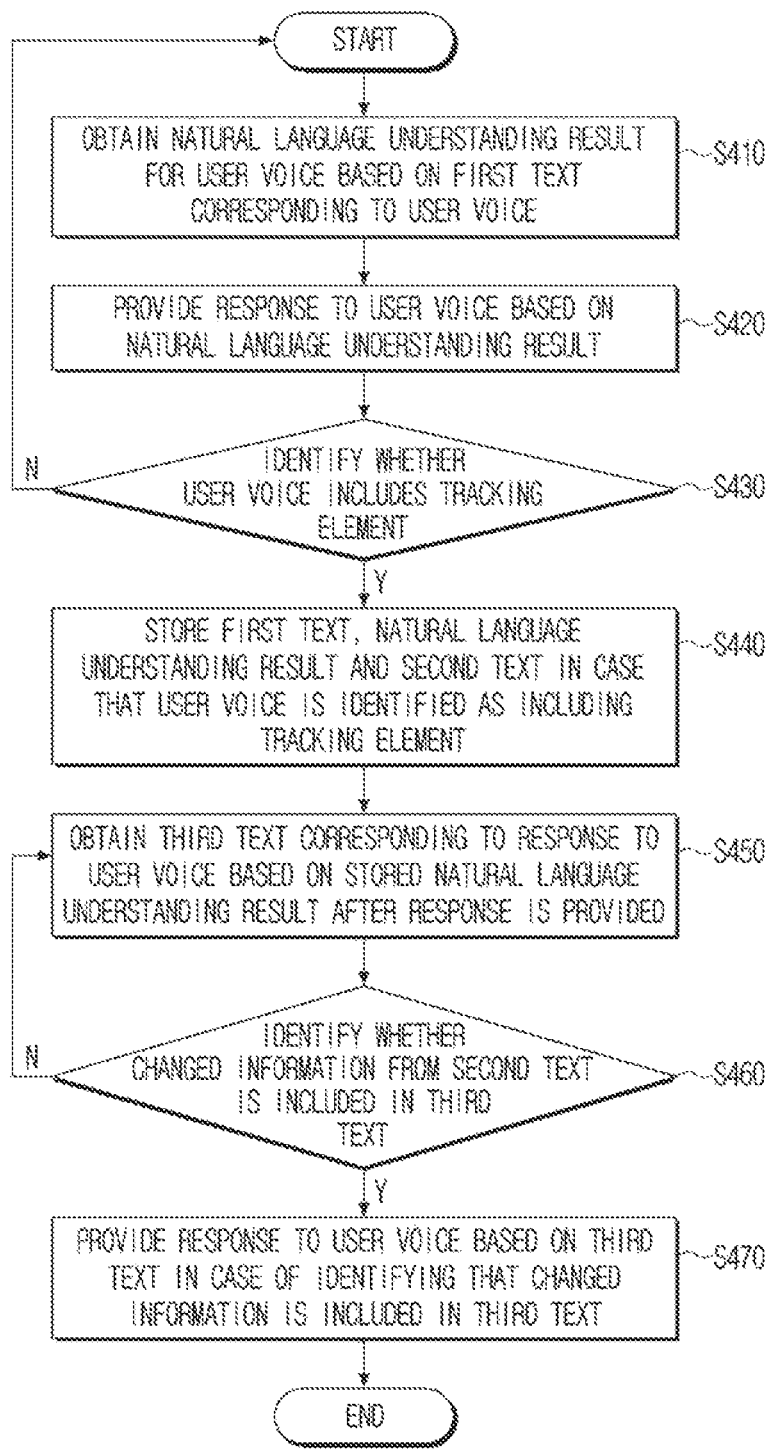
FIG. 3 is a flowchart schematically showing a method for providing the response to a user again in case that the changed information is included in the response information provided to the user according to another embodiment of the disclosure.

FIG. 3 is a flowchart schematically showing a method for providing a response to a user again in case that changed information is included in response information provided to the user according to another embodiment of the disclosure.

In operation S410, the processor 130 may obtain a natural language understanding result (referred to herein as "NLU result") for a user based on a first text corresponding to the user voice.

In detail, the processor 130 may obtain the user voice through the microphone 110. The processor 130 may convert the user voice obtained through the microphone 110 to an electric signal. The processor 130 may then control a first text 11 corresponding to the user voice which may be input to the NLU model 220 to be obtained in order for a NLU result 20 to be obtained.

The first text 11 may be text information corresponding to the user voice, and refer to text information obtained by inputting the user voice or the electric signal corresponding to the user voice to the ASR model 210.

According to an embodiment of the disclosure, the processor 130 may input the obtained user voice or the electric signal corresponding to the user voice to the ASR model 210 in order for the first text to be obtained.

Figure 4:
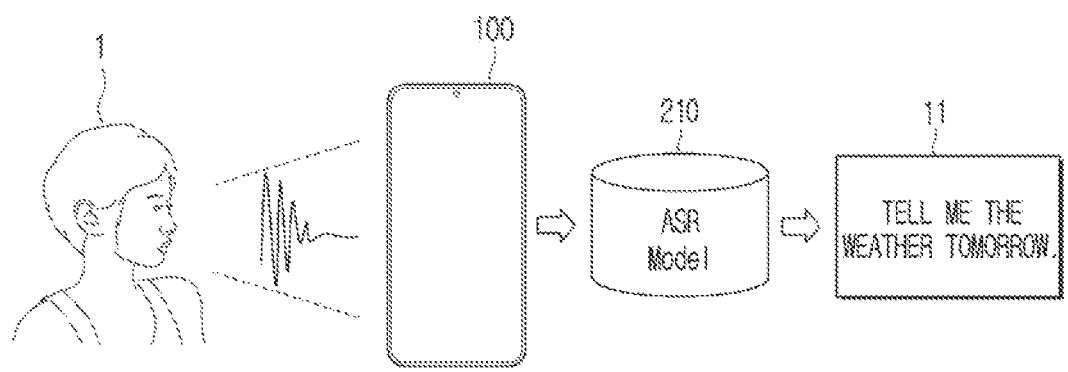
FIG. 4 is an exemplary diagram showing that a first text corresponding to a user voice is provided according to an embodiment of the disclosure.

FIG. 4 is an exemplary diagram showing analyzing a correlation between the user voice and user history information according to an embodiment of the disclosure.

Figure 5:
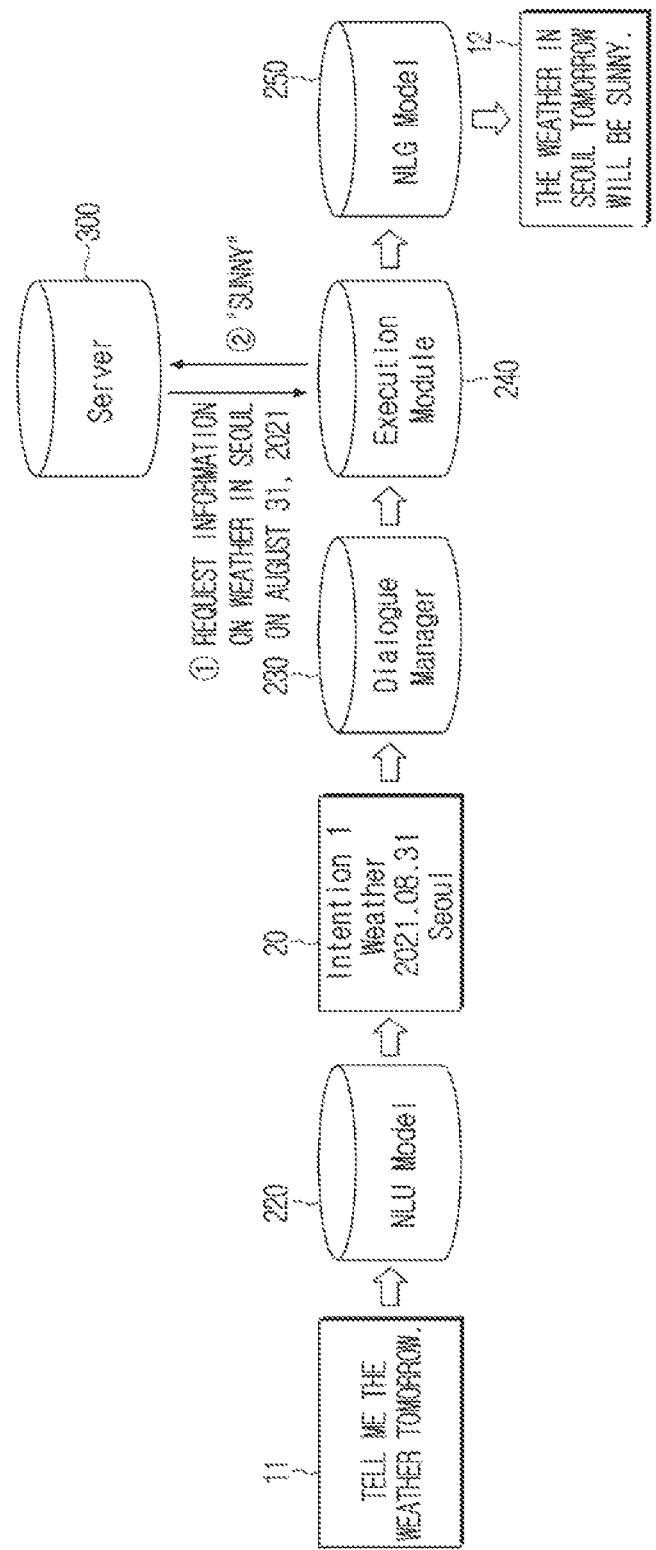
FIG. 5 is an exemplary diagram showing obtaining a natural language understanding result based on the first text, and providing the response corresponding to the user voice based on the obtained natural language understanding result, according to an embodiment of the disclosure.

FIG. 5 is an exemplary diagram showing obtaining a natural language understanding result 20 based on the first text, and providing the response corresponding to the user voice based on the obtained natural language understanding result 20, according to an embodiment of the disclosure.

The ASR model 210 may refer to a model that performs the voice identification for the user voice. The processor 130 may convert the user voice obtained through the microphone 110 to the text by the ASR model 210. Referring to FIG. 4, the processor 130 may obtain the user voice through the microphone 110 of the electronic device 100, and input the obtained user voice to the ASR model 210. The processor 130 may obtain the first text 11 as the text information corresponding to the user voice. The processor may identify the first text 11 corresponding to the user voice as "Tell me the weather tomorrow."

According to an embodiment of the disclosure, the ASR model may include an acoustic model (AM), a pronunciation model (PM), a language model (LM) and the like, and the AM may extract an acoustic feature of the obtained user voice and obtain phoneme sequence thereof. In addition, the PM may include a pronunciation dictionary (or pronunciation lexicon), and may obtain a word sequence by mapping the obtained phoneme sequence to a word. In addition, the LM may assign a probability to the obtained word sequence. That is, the ASR model may obtain the text corresponding to the user voice from an artificial intelligence model such as the AM, the PM or the LM. The ASR model may include an end-to-end voice identification model in which components of the AM, the PM and the LM are combined with each other into a single neural network. Information on the ASR model may be stored in the memory 120.

In case of obtaining the first text 11 corresponding to the user voice as a result of performing the voice identification, the processor 130 may obtain the NLU result 20 for the first text 11. In detail, the processor 130 may obtain the NLU result 20 for the first text 11 to be obtained by inputting the first text 11 to the NLU model.

According to an embodiment of the disclosure, the NLU model may be a deep neural network (DNN) engine made based on an artificial neural network. The NLU model may perform syntactic analysis and semantic analysis on the text obtained from the ASR model to obtain information on a user intention. In detail, in case that the first text corresponding to the user voice is obtained by the ASR model, the processor 130 may obtain the information on the user speech intention included in the user voice by inputting the obtained first text to the NLU model. However, the NLU model is not limited thereto, and may be a rule-based rule engine according to another example of the disclosure.

According to an embodiment of the disclosure, the processor 130 may obtain an entity information for specifically classifying or identifying a function that the user intends to perform through the voice together with the user speech intention relating to the user voice based on the NLU model.

For example, referring to FIG. 5, the processor 130 may input the first text (e.g., "Tell me the weather tomorrow") obtained by the ASR model 210 to the NLU model 220 for the NLU result 20 for the first text to be obtained. The NLU result 20 may include results of identifying intention in the first text and ultimately the user speech intention included in the user voice. FIG. 5 shows that the user intention in the first text 11 in the NLU result 20 is identified as "Intention 1." "Intention 1" may correspond to identification information corresponding to "weather search." The NLU result 20 may include the plurality of entity information in addition to the identified user speech intention. For example, the NLU result 20 may include time information and location information of the weather requested by the user. Referring to FIG. 5, the NLU result 20 may include the time information on the weather, that is, "weather on Aug. 31, 2021" which corresponds to tomorrow's weather and "Seoul" which corresponds to the location information of the weather. However, the NLU result 20 is not limited thereto, and may include various additional information (e.g., information on emotion included in a counterpart speech).

The NLU model may distinguish grammatical units (e.g., words, phrases, morphemes and the like) of the obtained first text 11, and identify which grammatical elements the divided grammatical units have. The NLU model may then identify the meaning of the first text based on the identified grammatical elements.

Referring back to FIG. 3, according to an embodiment of the disclosure, in operation S420, the processor 130 may provide the response on the user voice based on the NLU result 20.

Referring back to FIG. 5, the processor 130 may identify whether the user intention identified using the NLU model 220 is clear by using the dialogue manager module 230. For example, the dialogue manager module 230 may identify whether the user intention and the entity information are sufficient in performing a task to identify whether the user intention is clear or to provide the response corresponding to the user voice, based on the identified user speech intention and the entity information which are included in the NLU result 20.

According to an embodiment, the processor 130 may perform a feedback requesting information necessary for the user in case that the user intention is not clear by using the dialogue manager module 230. For example, the dialogue manager module 230 may perform the feedback requesting information on a parameter for identifying the user intention.

In case that it is identified that the processor 130 may accurately identify the user speech intention based on the NLU result 20, the processor 130 perform the task corresponding to the user voice through the execution module 240. For example, consider a case of obtaining the user voice saying "Turn on the flashlight." The processor 130 may clearly identify that the user intention is to operate a flash module positioned in the electronic device 100, based on the NLU result 20 obtained by the NLU model 220. In this case, the processor 130 may drive the flash module by providing a control command for driving the flash module positioned in the electronic device 100 by using the execution module 240.

Alternatively, referring to FIG. 5, consider a case of obtaining the user voice saying "Tell me the weather tomorrow." The processor 130 may identify that the user speech intention may be clearly identified using the dialogue manager module 230. In this case, the processor 130 may request the server to provide weather information on "tomorrow's weather" (i.e., information on weather in "Seoul" on Aug. 31, 2021) based on the execution module 240. The processor 130 may then obtain the weather information corresponding to "sunny" as the weather information on "tomorrow's weather." from the server 300.

The processor 130 may change a result of the task performed or obtained by the execution module 240 into a text form by using the NLG model 250. The changed information in a form of the text may be in a form of a natural language speech. In detail, referring to FIG. 5, the processor 130 may obtain the information corresponding to "sunny" with respect to tomorrow's weather from the server 300. The processor 130 may obtain a second text 12, i.e. a text "The weather in Seoul tomorrow will be sunny," as the response on the user voice, based on the obtained weather information (i.e., "sunny").

The processor 130 may output the obtained second text 12 in the form of a speech through a speaker or the like. In this manner, it is possible to exhibit an effect such as the user obtaining desired information through a conversation with the electronic device 100, thereby increasing effectiveness of the electronic device 100.

Referring back to FIG. 3, in operation S430, the processor 130 may identify whether the user voice includes a tracking element based on the NLU result 20 and the second text 12 corresponding to the response after the response on the user voice is provided.

"Tracking" may refer to a process for continuously providing a third text as a response on the user voice after providing the user with the response based on the second text 12. The third text may be a text provided in response on the user voice like the second text 12. However, the third text may be distinguished in that the second text 12 relates to the response provided in case that the user voice is initially obtained, whereas the third text relates to response provided to correspond to the user voice after the second text 12.

The tracking element may refer to a criterion for identifying whether the processor 130 performs a tracking process for the user voice. Accordingly, the processor 130 may identify whether the tracking element is included in the user voice after the response is provided based on the second text 12. That is, in relation to the response on the user voice, the processor 130 may identify whether the response may be changed over time or under a condition, based on the user voice. Referring back to the above example, it may be assumed that the user voice corresponds to "Turn on the flashlight," and in response to this request, the processor 130 drives the flash module included in the electronic device 100. In this case, the processor 130 may identify that the tracking element is not included in the user voice, "Turn on the flashlight." The reason is that the response to the operation of the flash module is not changed without a separate command or user voice to control the flash module.

On the other hand, the processor 130 may identify that the tracking element is included in the user voice, "Tell me the weather tomorrow." The reason is that the weather information may be changed over time. That is, a different response may be provided depending on a time point when the user voice (i.e., "Tell me the weather tomorrow") is obtained. In more detail, the processor 130 obtain the voice saying "Tell me the weather tomorrow" from the user 1 at 09:00 am on August 30 thorough the microphone 110, 2021. The processor 130 may then provide the response of "The weather tomorrow will be sunny" for the user 1 based on the weather information obtained from the server 300. However, the forecasted tomorrow's weather may be changed from "sunny" to "cloudy and rainy" due to various causes such as changes in atmospheric pressure. In this case, the response "The weather tomorrow will be sunny" provided to the user in the morning may be turned out to be incorrect information. Therefore, according to an embodiment of the disclosure, the processor may identify whether the tracking element is included in the user voice, and perform the tracking process for the user voice based on the user voice identification.

Figure 6:
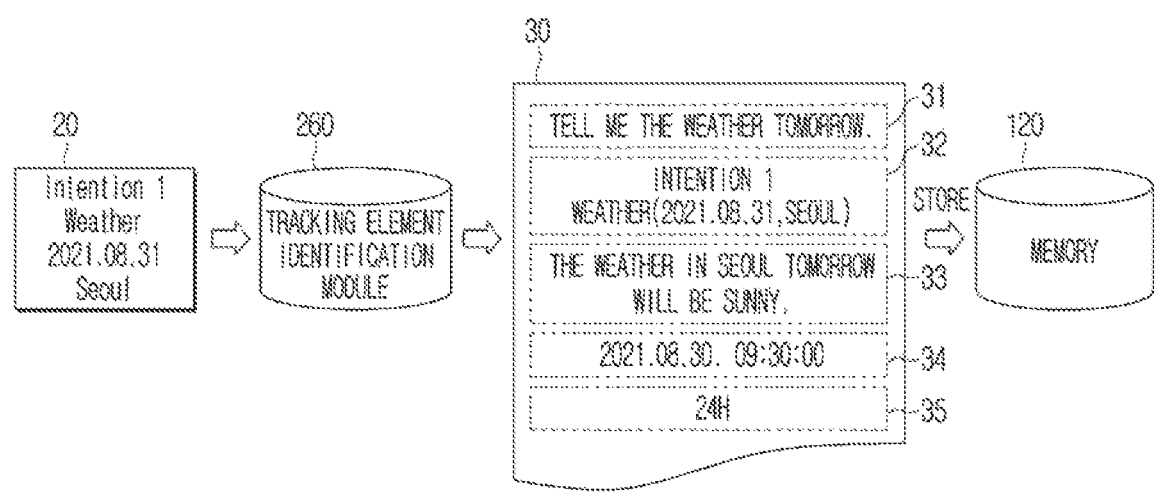
FIG. 6 is an exemplary diagram showing identifying the presence of a tracking element in the user voice and obtaining a tracking list according to an embodiment of the disclosure.

FIG. 6 is an exemplary diagram showing identifying the presence of the tracking element in the user voice and obtaining a tracking list according to an embodiment of the disclosure.

According to an embodiment of the disclosure, the processor 130 may, via the tracking element identification module 260, identify that there is the tracking element in the user voice in case that the user speech intention included in the user voice corresponds to a predetermined intention based on the NLU result 20. That is, referring to FIG. 5, for example, in case of "Intention 1," it may be assumed that the tracking element is predetermined in the user voice. The processor 130 may identify that the user voice corresponds to "Intention 1" corresponding to the "weather search" based on the NLU result 20, and ultimately identify that the tracking element is included in the user voice.

In more detail, according to an embodiment of the disclosure, the processor 130 may identify that the user voice includes the tracking element in case that the user intention included in the user voice is to request information that is likely to be changed over time.

In detail, the processor 130 may identify that the user voice includes the tracking element in case that the user speech intention included in the user voice is identified as being to search for or to provide information which may be changed over time, based on the NLU result 20 for the user voice.

According to an embodiment of the disclosure, the processor 130 may request for the server 300 to search corresponding to the user voice to provide the response to the user voice based on the NLU result 20, and identify that the user voice includes the tracking element in case that a search result is obtained from the server 300.

The processor 130 may identify whether the user voice includes the tracking element based on the second text 12. In detail, the processor 130 may identify whether the user voice includes the tracking element based on the result of the task performed by the execution module. As described above, the processor 130 may perform the task for the user voice based on the execution module 240. Here, in performing the task, the processor 130 may request the server 300 to transmit the specific information or to search for the specific information. The processor 130 may identify that the user voice includes the tracking element in case that the specific information or the search result in response thereto is obtained.

Furthermore, if the processor 130 determines that there is no tracking element in the user voice, the method may end or restart. If the processor 130 determines that there is a tracking element in the user voice, the processor may proceed to operation S440.

Referring to FIG. 3, in operation S440, the processor 130 may store the first text 11, the NLU result 20 and the second text 12 in the memory 120 in case that the user voice is identified as including the tracking element.

The processor 130 may generate tracking list information related to the user voice identified as including the tracking element and store the tracking list information in the memory 120. To this end, the processor 130 may process the first text 11, the NLU result 20 and the second text 12 in a form of tracking information 30 included in the tracking list. Referring to FIG. 6, the processor 130 may generate the tracking information 30 including a plurality of information for continuously tracking the user voice. Referring to FIG. 6, the tracking information 30 may include information 31 on the first text 11 corresponding to the user voice, information 32 on the NLU result 20, and information 33 on the second text 12. In addition, the tracking information 30 may include time information 34 on a time point when the second text 12 is provided.

The tracking information 30 may include time information set by the processor 130 to track the user voice (or time information stored in the memory as the tracking list). That is, referring to FIG. 6, the tracking information 30 may include the user voice including tracking element and the time information (e.g., 24 hours) in which the processor 130 tracking the response on the user voice. The processor 130 may perform the tracking process for the user voice for 24 hours after the time point when the second text 12 is provided (e.g., Aug. 30, 2021). Alternatively, the processor 130 may delete the corresponding tracking information from the tracking list stored in the memory 120 in case that 24 hours elapses since the time point when the second text 12 is provided (e.g., Aug. 30, 2021).

Referring back to FIG. 3, in operation S450, the processor 130 may obtain a third text 13 corresponding to the response on the user voice based on the stored NLU result 20 after the response is provided.

Figure 7:
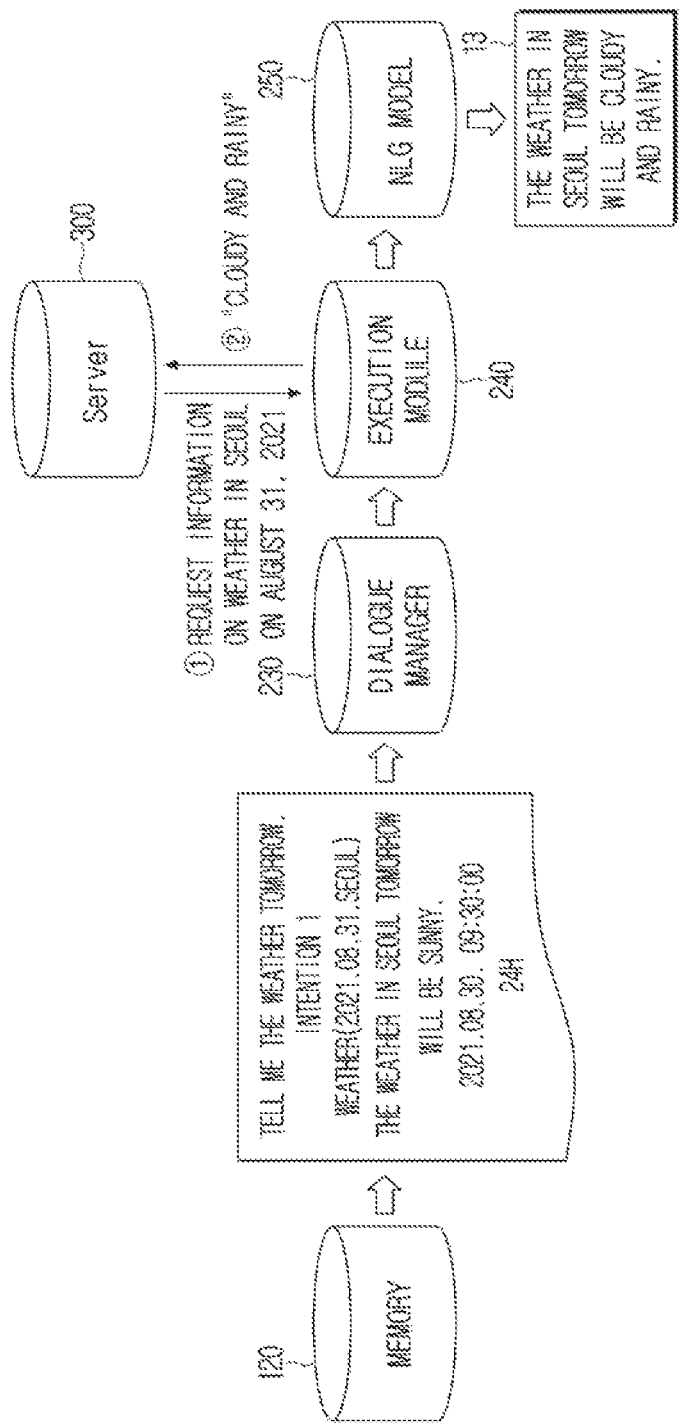
FIG. 7 is an exemplary diagram showing obtaining a third text for the user voice based on the stored tracking list according to an embodiment of the disclosure.

FIG. 7 is an exemplary diagram showing obtaining the third text for the user voice based on the stored tracking list according to an embodiment of the disclosure.

Referring to FIG. 7, after the response is provided based on the second text 12, the processor 130 may obtain the third text 13 corresponding to the response on the user voice based on the stored tracking information. In more detail, the processor 130 may extract information on the NLU result 20, included in the tracking information 30, and perform the task for the extracted NLU result 20 based on the execution module 240. That is, the processor 130 may repeat the process for providing the second text 12 described above. The first text 11 and the NLU result 20 may be already included in the tracking information, and thus omitted are a voice identification process using the ASR model 210 and a NLU process for the first text 11 performed by using the NLU model 220.

Referring to FIG. 7, the processor 130 may obtain weather information different from the second text 12 from the server 300 by the execution module 240. In detail, referring to FIG. 5, the processor 130 may obtain information of "sunny" on tomorrow's weather from the server 300 at the time point when the user voice is obtained, and may obtain information of "cloudy and rainy" on tomorrow's weather from the server 300 after the user 1 is provided with the response. The processor 130 may then allow obtain the third text 13 corresponding to "The weather tomorrow will be cloudy and rainy," based on tomorrow's weather information obtained from the server 300.

The processor 130 may periodically obtain the third text 13 as the response on the user voice, based on the NLU result 20. For example, referring to FIG. 6, assume that a predetermined period is one hour. In this case, the processor 130 may obtain the third text 13 for the response on the user voice (e.g., "Tell me the weather tomorrow") every hour after 09:30 on Aug. 30, 2021 at which the response corresponding to the second text 12 (e.g., "The weather in Seoul tomorrow will be sunny") is provided.

As described above, the processor 130 may perform the tracking process up to a predetermined time. In this regard, the disclosure provides a detailed method for identifying or setting an end of the tracking process.

According to an embodiment of the disclosure, in operation S450, the processor 130 may obtain the third text 13 until a time point corresponding to the time information after the response is provided in case that the user voice is identified as including the time information based on the NLU result 20.

The processor 130 may identify whether time information related to the user voice is included in the NLU result 20. The processor 130 may obtain the time information related to the user voice by using the user speech intention and the entity information, based on the NLU result 20. For example, referring to FIG. 5, the processor 130 may identify that the time information of "Aug. 31, 2021" is included in the user voice by particularly using the entity information for "Aug. 31, 2021" included in the NLU result 20, based on the NLU result 20. That is, the processor 130 may identify that the time information of "tomorrow" is included in the user voice saying "Tell me the weather tomorrow" and that "tomorrow" corresponds to "Aug. 31, 2021."

The processor 130 may then obtain the third text 13 until the time point of the time information identified after the response is provided. Referring back to FIG. 5, the processor 130 may obtain the third text 13 by Aug. 31, 2021, which is the time information included in the user voice. After Aug. 31, 2021, the processor 130 may stop the tracking process for the user voice saying "Tell me the weather tomorrow." That is, the processor 130 may not obtain the third text 13. The corresponding tracking information may also be deleted from the tracking list stored in the memory 120.

According to an embodiment of the disclosure, the processor 130 may obtain the third text 13 to be obtained for the predetermined time in case of identifying that the time information in the user voice is not identified or is not included. For example, assume that the user inputs the voice "Tell me the weather" through the AI assistant. The NLU result 20 for the first text 11 corresponding to the corresponding voice may not include the entity information related to time. That is, the processor 130 may identify that the user voice does not include the time information based on the NLU result 20 obtained by the NLU model 220. The processor 130 may obtain the third text 13 only for the predetermined time after the time point when the response corresponding to the second text 12 is provided.

Referring back to FIG. 3, in operation S460, the processor 130 may identify whether the changed information from the second text 12 is included in the third text 13 by comparing the second text 12 with the third text 13 after the third text 13 is obtained.

In detail, a changed-element identification module 270 may extract the information 33 on the second text 12 in the tracking information stored in the memory 120, and compare the extracted second text 12 with the third text 13 obtained by the NLG module. The changed-element identification module 270 may then identify whether the changed information from the second text 12 is included in the third text 13.

The processor 130 may identify whether the changed information is included in the third text 13 by comparing the information obtained from the server 300. In detail, the processor 130 may compare the information obtained from the server 300 including the second text 12 with the information obtained from the server 300 including the third text 13, and identify that the changed element is included in the third text 13 in case that respective information are different from each other.

In addition, according to an embodiment of the disclosure, the processor 130 may obtain each of the NLU result 20 for each of the stored second text 12 and third text 13 by inputting respectively the stored second text 12 and third text 13 to the NLU model 221, and identify whether the changed element is included in the third text 13 based on the obtained NLU result 20.

Figure 8:
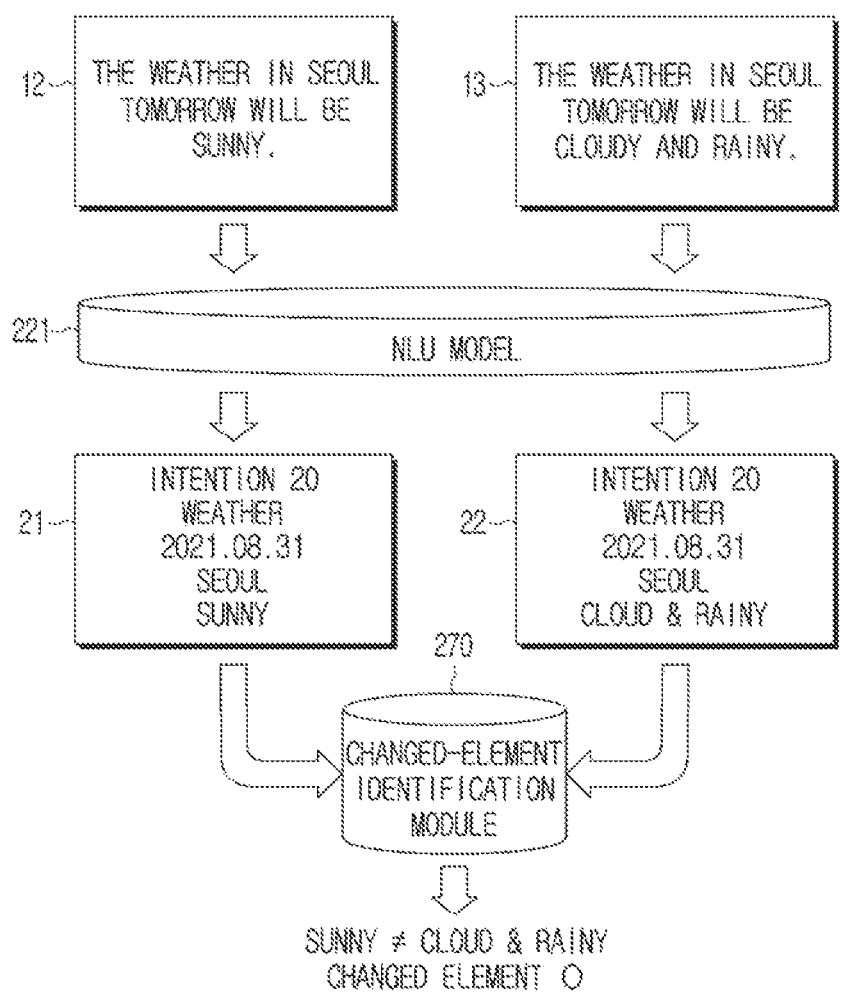
FIG. 8 is an exemplary diagram showing identifying the presence of a changed element by comparing a second text and the third text according to an embodiment of the disclosure.

FIG. 8 is an exemplary diagram showing identifying the presence of the changed element by comparing the second text and the third text according to an embodiment of the disclosure.

Referring to FIG. 8, the processor 130 may use the NLU result 21, 22 for each of the second text 12 and the third text 13 to compare the second text 12 with the third text 13. The processor 130 may obtain the NLU result 21. 22 for each of the second text 12 and the third text 13 from the NLU model 221.

The user speech intention and the entity information may be included in the NLU result 21. 22 for each of the second text 12 and the third text 13. For example, the processor 130 may identify the user speech intention included in the second and third texts 12 and 13 corresponding to the response to the same user voice as the same user intention (e.g., "Intention 20"). In addition, the processor 130 may identify that the entity information (e.g., weather on Aug. 31, 2021) related to the time and the entity information related to the location (e.g., "Seoul"), in relation to the weather information, are the same as each other. However, the processor 130 may identify entity information related to a weather type, in relation to tomorrow's weather, different from the above entity information. In detail, the weather type for the second text 12 may be identified as "sunny," while the weather type for the third text 13 may be identified as "cloudy and rainy." In this manner, the processor 130 may identify that the changed information from the second text 12 is included in the third text 13, that is, the weather type information is changed.

According to an embodiment of the disclosure, the NLU model 221 used to compare the second text 12 and the third text 13 with each other may be different from the NLU model 220 used to obtain the NLU result for the first text 11. In detail, training data may include types of the text, information included in the text, and tagging data corresponding thereto, which are different from each other, the training data being used to train the NLU model 220 for the first text 11 corresponding to the user voice and the training data being used to train the NLU model 221 for the second text 12 and the third text 13 corresponding to the response on the user voice. Accordingly, the NLU model 221 used to obtain the NLU results 21, 22 for the second text 12 and the third text 13 may be different from the NLU model 220 used to obtain the NLU result for the first text 11.

However, the disclosure is not limited thereto. The processor 130 may also perform a pre-processing process of providing the training data by applying the same type of tagging data to the first text 11 (or the plurality of texts corresponding to the user voice) and the second and third text 12 and 13 (or the plurality of texts corresponding to the response), and obtain the NLU results for the first text 11 and the second and third texts 12 and 13 based on the one NLU model trained based on the pre-processed training data.

Referring to FIG. 3, in operation S460, if the processor 130 identifies that changed information from the second text 12 is included in the third text 13, the processor 130 may proceed to operation S470. In operation S470, the processor 130 may provide the response based on the third text 13 in case that the changed information is identified as being included in the third text 13. If the processor 130 identifies that changed information from the second text 12 is not included in the third text 13, the processor may repeat operation S450.

Figure 9:
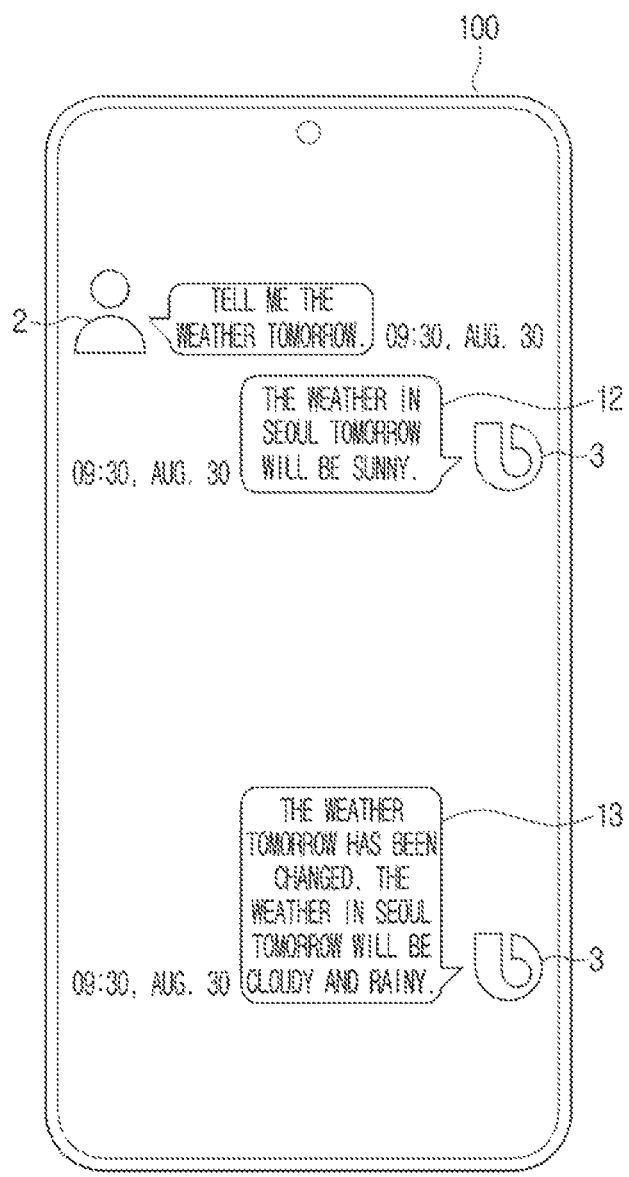
FIG. 9 is an exemplary diagram showing providing the response based on the third text according to an embodiment of the disclosure.

FIG. 9 is an exemplary diagram showing providing the response based on the third text according to an embodiment of the disclosure.

In detail, the processor 130 may provide the response based on the third text 13 in case that the changed information from the second text 12 is identified as being included in the third text 13 even without obtaining the user voice through the microphone 110. This provision may be different from the provision of the second text 12 after the user voice is obtained.

As in case that the second text 12 is provided, the processor 130 may output the response based on the third text 13 in the form of a speech through the speaker or in the form of a message through the display.

Referring to FIG. 9, the user may input the user voice saying "Tell me the weather tomorrow" through the AI assistant. The message corresponding to the user voice may be displayed on a display of the electronic device 100 together with an icon 2 corresponding to the user. The electronic device 100 that obtains the user voice may obtain the second text 12 of "The weather in Seoul tomorrow will be sunny" based on the above-described voice identification process and NLU process, and display the same on the display in the form of a message. An icon 3 corresponding to the AI assistant may be displayed together. The electronic device 100 may then perform the tracking process for the user voice. In addition, the electronic device 100 may provide the response based on the third text 13 in case that the third text 13 obtained through the tracking process is identified as including the changed information from the second text 12. In detail, the electronic device 100 may provide various responses based on the third text 13 of "The weather in Seoul tomorrow will be cloudy and rainy." That is, the electronic device 100 may output the third text 13 itself in the form of a message, and may provide the response in which the third text 13 and predetermined phrases, sentences, words and the like are combined with each other for the user to recognize the change occurs in the previously requested information through the user voice.

After the response is provided based on the third text 13, the processor 130 may update the tracking information 30 stored in the memory based on the third text 13. In detail, the processor 130 may change the information related to the second text 12 including in the tracking information 30 to the information related to the third text 13, or may update the tracking information 30 by adding the information related to the third text 13. The processor 130 may then obtain a fourth text for the user voice for a period in which the tracking process is set to be performed, and compare the third text 13 with the obtained fourth text. The processor 130 may then provide the response to the user 1 again based on the fourth text in case that the changed information is identified as being included in the fourth text. In this manner, the user may be continuously provided with a new response whenever the change occurs in the response regarding the input user voice. The user may also continuously obtain updated new information related to the requested information through the user voice.

Figure 10:
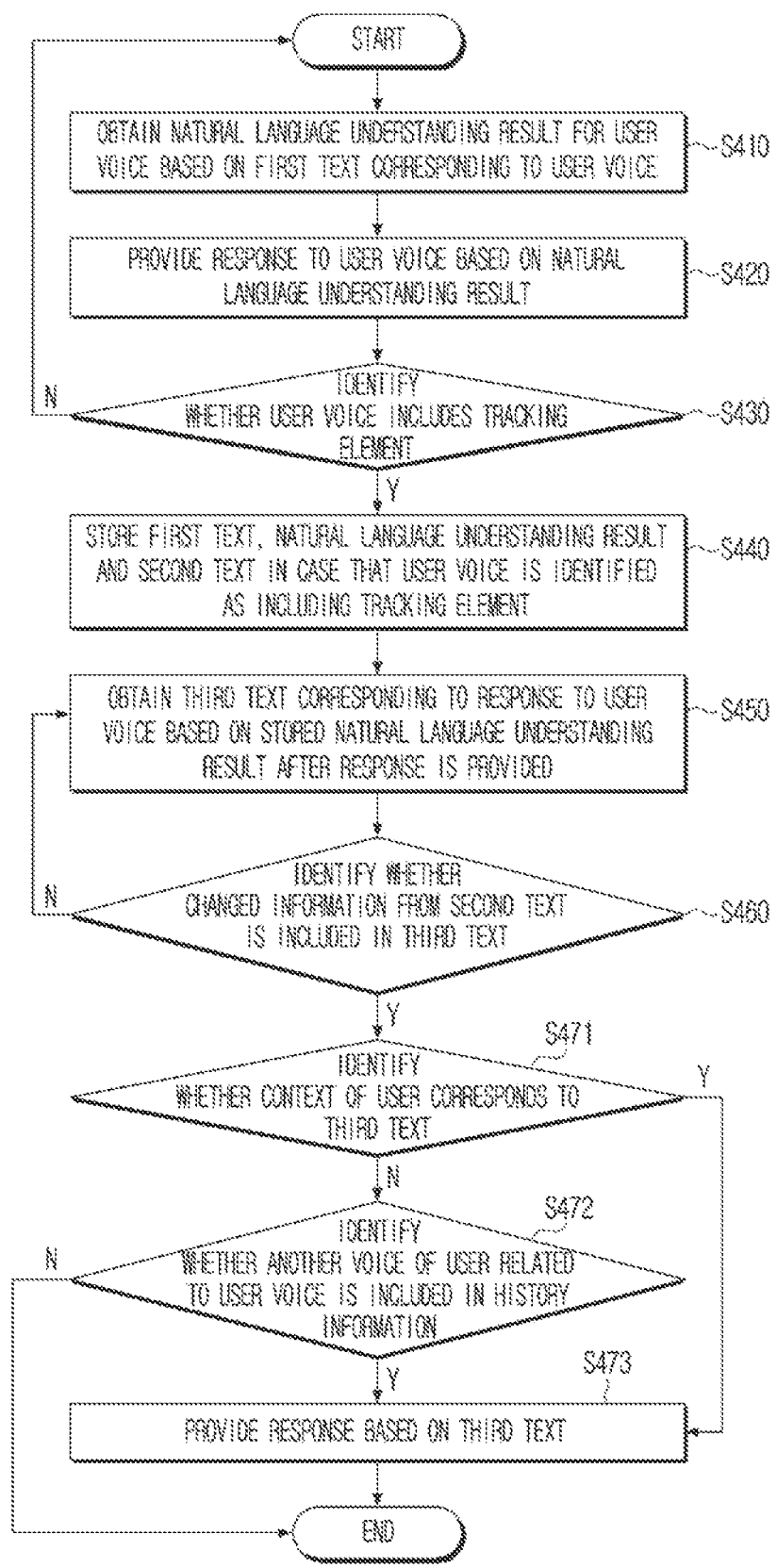
FIG. 10 is a flowchart schematically showing a method for identifying whether to provide the third text according to another embodiment of the disclosure.

FIG. 10 is a flowchart schematically showing a method for identifying whether to provide the third text according to another embodiment of the disclosure.

Figure 11:
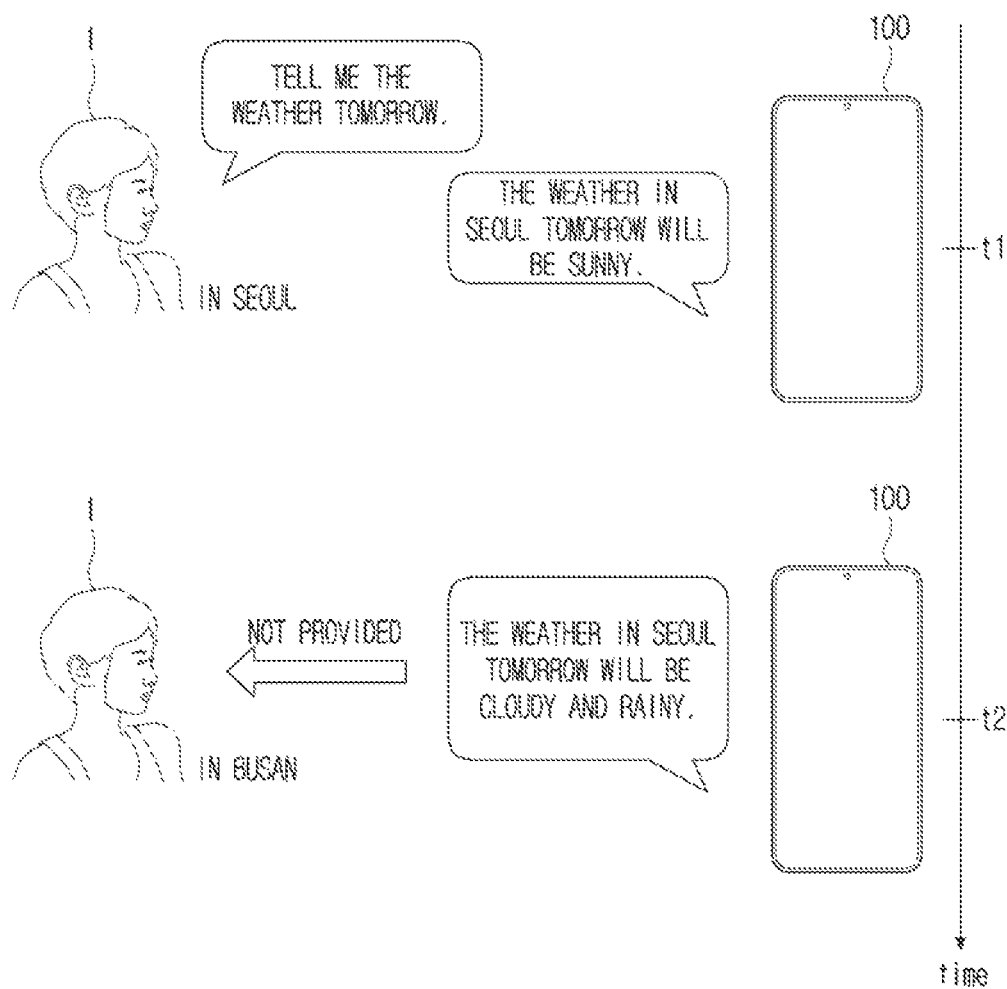
FIG. 11 is an exemplary diagram showing identifying whether to provide the third text based on a context of the user according to an embodiment of the disclosure.
Figure 12:
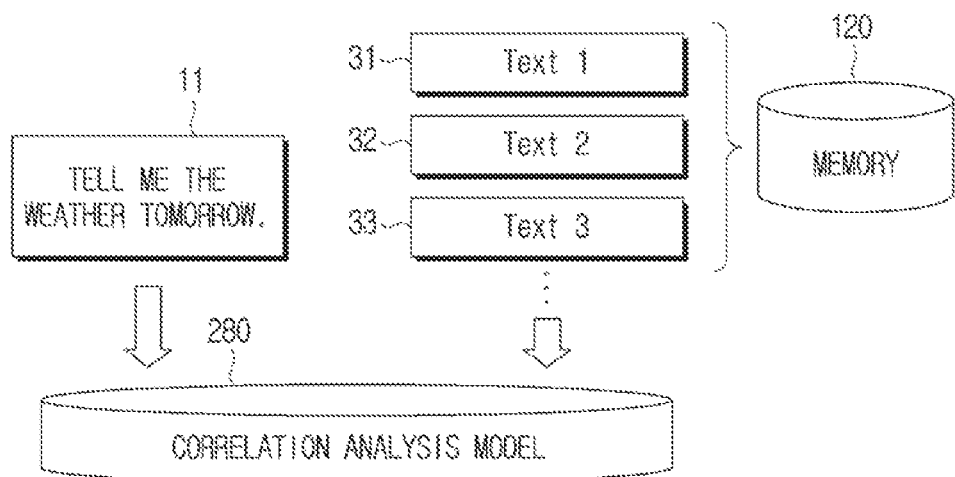
FIG. 12 is an exemplary diagram showing analyzing a correlation between the user voice and user history information according to an embodiment of the disclosure.
Figure 13:
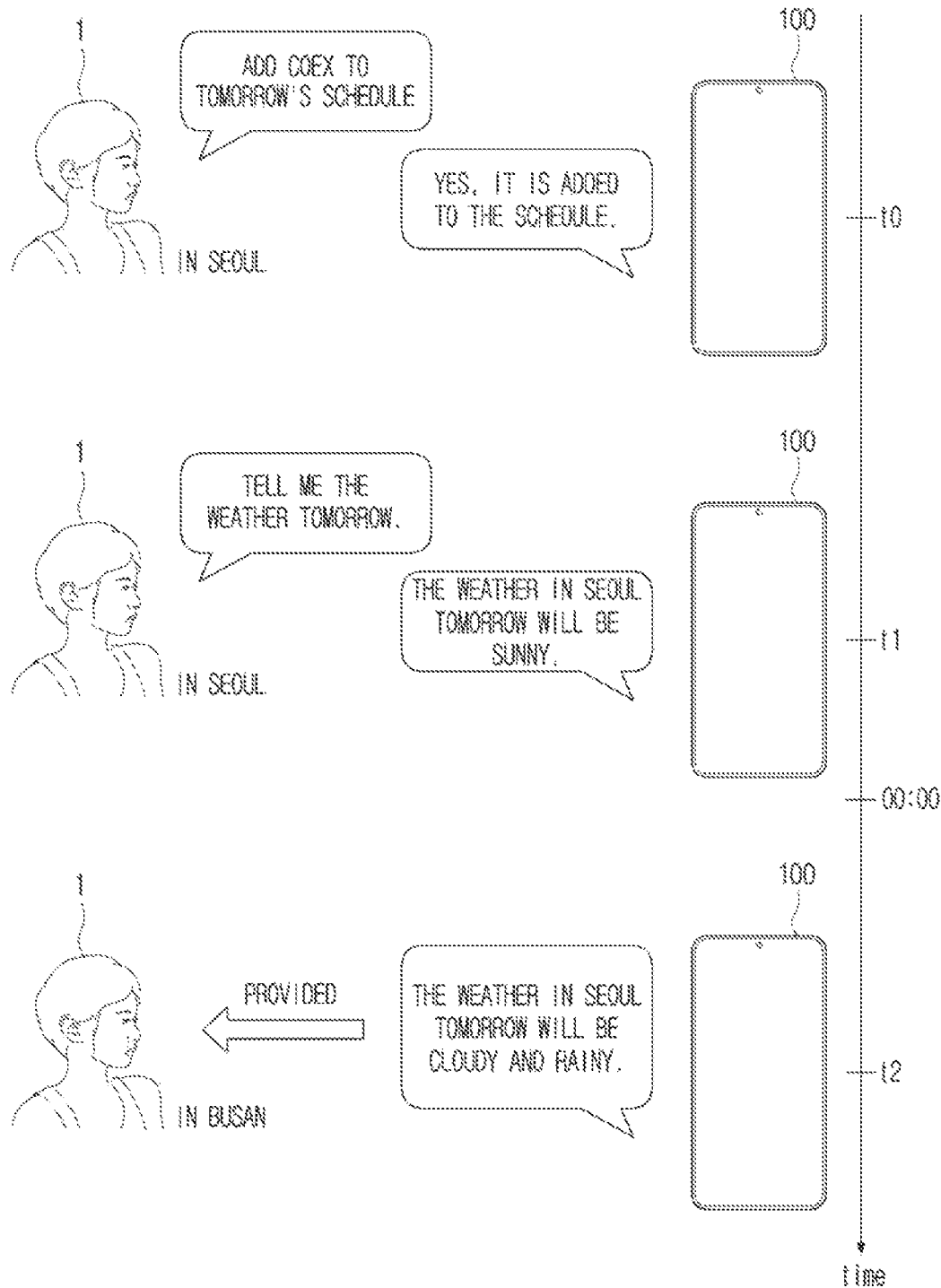
FIG. 13 is an exemplary diagram showing identifying whether to provide the third text based on the user history information according to an embodiment of the disclosure.

FIG. 11 is an exemplary diagram showing identifying whether to provide the third text based on a context of the user according to an embodiment of the disclosure;

FIG. 12 is an exemplary diagram showing analyzing a correlation between the user voice and user history information according to an embodiment of the disclosure; and FIG. 13 is an exemplary diagram showing identifying whether to provide the third text based on the user history information according to an embodiment of the disclosure.

According to an embodiment of the disclosure, the processor 130 may selectively provide the response based on the third text 13 even though the changed information from the second text 12 is included in the third text 13.

Referring to FIG. 10, in operation S471, the processor 130 may identify whether the context of the user who speaks the user voice corresponds to the third text 13 at a time point when the response based on the third text 13 is provided, and provide the response based on the third text 13 in case that the identified context of the user is identified as corresponding to the third text 13.

According to an embodiment of the disclosure, the context may refer to information related to the user. In detail, the context may include user location information for the user who uses the electronic device 100, time information when the user uses the electronic device 100, information obtained by analyzing the user voice, and the like. The context may include information which may be obtained in relation to the user inside and outside the electronic device 100.

In detail, the processor 130 may obtain context information for the user 1 at a time point when the response based on the third text 13 is provided. The processor 130 may then identify whether the obtained context information for the user 1 corresponds to the third text 13. To this end, the processor 130 may use the NLU result for the third text 13. The processor 130 may then provide the response based on the third text 13 in case that the context information for the identified user 1 and the third text 13 are identified as corresponding to each other.

Referring to FIG. 11, the processor 130 may identify that the changed information is included in the third text 13 at a time point t2. The processor 130 may obtain the context information for the user at the time point t2 before the response is provided based on the third text 13. The processor 130 may identify that the user is in "Busan" as the context information related to a user location. The processor 130 may then identify that the third text 13 related to "Seoul" and "Busan" which is the context information for the user location do not correspond to each other. Accordingly, the processor 130 does not provide the user 1 with the response based on the third text 13. The reason is that the changed information on the weather in "Seoul" may be less useful to the user 1 in "Busan" even if the processor 130 provides the response based on the third text 13 notifying that the weather in "Seoul" is changed at the time point t2. In operation S471, if the processor does not identify that the context of the user corresponds to the third text 13, the processor 130 may proceed to operation S473.

Referring to FIG. 10, in operation S472, the processor 130 may identify whether another voice of the user related to the user voice is included in the history information including information on the plurality of user voices and the responses respectively corresponding to the plurality of user voices in case that the identified context is identified as not corresponding to the third text 13. If the processor 130 does not identify that another voice of the user related to the user voice is included in the history information, the processor 130 may end the process. If the processor does identify that another voice of the user related to the user voice is included in the history information, the processor 130 may provide the response based on the third text 13 in operation S473.

The history information may include the user voice information obtained through the microphone 110 and information input through an input interface in order to use the AI assistant. The history information may also include information related to the user voice and the response provided by the AI assistant in response to the user input. That is, referring to the above example, the history information may include all of the user voice, the text corresponding to the user voice and the text related to the response. The history information is not limited thereto, and may include information input from the user, information obtained in relation to the user and the like in using the electronic device 100. The history information may be stored in the memory 120.

The processor 130 may identify whether a voice or text having a correlation with respect to the user voice is included in the history information. In detail, referring to FIG. 12, the processor 130 may identify whether another voice of the user related to the user voice or the text corresponding to another voice of the user is included in the history information stored in the memory by using a correlation analysis model 280.

The correlation analysis model 280 may extract each feature map of the plurality of texts corresponding to the first text 11 corresponding to the user voice and another voice of the user in the history information, embed each feature map as an n-dimensional vector (here, n is a natural number greater than or equal to 2), and measure the Euclidean distance between the respective vectors, thereby measuring the relevance of each text in the history information with the first text 11. To this end, the correlation analysis model 280 may extract each feature map of the first text 11 and one or more texts in the history information through a process of a pooling layer. The pooling layer may correspond to either the average pooling layer or the max pooling layer, and is not limited thereto.

The extracted feature map may be embedded as the n-dimensional vector. Here, n is the natural number greater than or equal to 2. For example, the extracted feature map may include 512-dimensional features. In this case, information on the 512-dimensional features may be reduced to three dimensions by using a T-stochastic neighbor embedding (t-SNE) method and embedded into a three-dimensional vector. The correlation analysis model 280 may then display the three-dimensional vector in a three-dimensional space, and measure the Euclidean distance to the three-dimensional vector of each text in the history information based on the three-dimensional vector of the first text 11. The correlation analysis model 280 may measure their relevance based on the measured Euclidean distance. The correlation analysis model 280 may identify that the first text 11 and the corresponding text have a higher degree of relevance to each other in case that the Euclidean distance is less than a predetermined value. The correlation analysis model 280 may then ultimately identify that another voice of the user related to the user voice is included in the history information.

In detail, referring to FIG. 13, the processor 130 may obtain a voice saying "Add COEX to tomorrow's schedule" from the user who uses the AI assistant at a time point t0. The processor 130 may store the obtained voice or text corresponding to the obtained voice by using the ASR model 210 in the memory 120 as the history information. The processor 130 may then obtain the voice saying "Tell me the weather tomorrow" from the user who uses the AI assistant at the time t1, and provide the response saying "The weather in Seoul tomorrow will be sunny.". As described above, the response of "The weather in Seoul tomorrow will be sunny" may be provided based on the second text 12. After the response is provided based on the second text 12, the processor 130 may perform the tracking process for the user voice, "Tell me the weather tomorrow." That is, the processor 130 may obtain the third text 13 to be repeatedly obtained. The processor 130 may then obtain "The weather in Seoul tomorrow will be cloudy and rainy" as the third text 13 at the time point t2, and identify that the changed information from the second text is included in the third text 13. The processor 130 may identify that the context (e.g., "Busan") related to the user location does not correspond to the third text 13 at the time point 2. However, the processor 130 may identify that the history information includes the user voice obtained at the time point t0, which is related to the user voice obtained at the time point t1. Accordingly, the processor 130 may provide the response to the user based on the third text 13, unlike in FIG. 11.

In the above detailed description, operations S410 to S473 may be further divided into additional steps or combined into fewer steps, according to another embodiment of the disclosure. In addition, some steps may be omitted as needed, and an order between steps may be changed.

Figure 14:
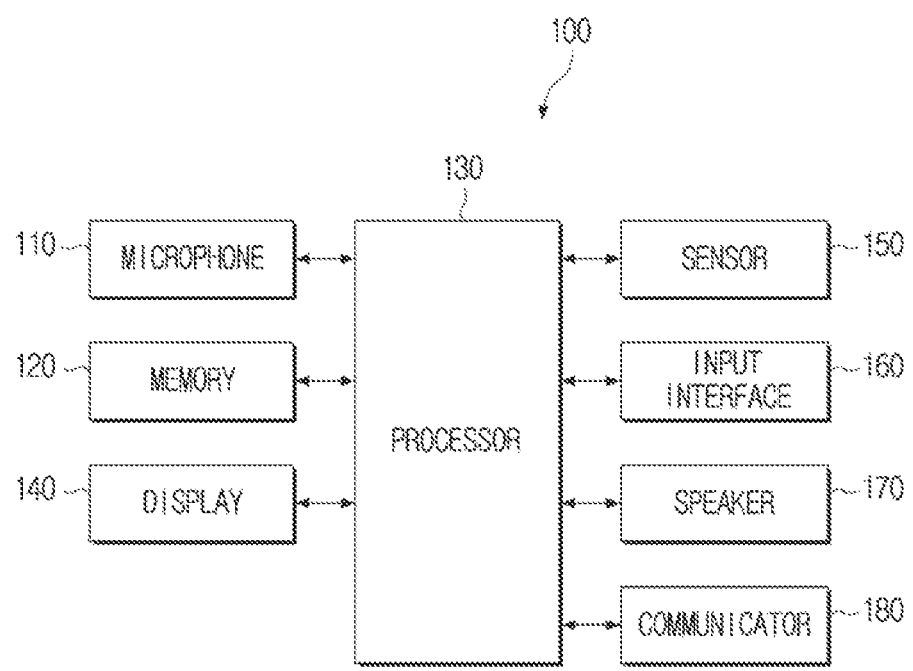
FIG. 14 is a detailed configuration diagram of the electronic device according to an embodiment of the disclosure.

FIG. 14 is a detailed configuration diagram of the electronic device according to an embodiment of the disclosure.

Referring to FIG. 14, according to an embodiment of the disclosure, the electronic device 100 may include the microphone 110, the memory 120, the processor 130, a display 140, a sensor 150, an input interface 160, a speaker 170 and a communicator 180. The detailed descriptions of the microphone 110, the memory 120 and the processor 130 are described above, and thus omitted.

The electronic device 100 may output an image through the display 140. For example, referring to FIG. 9, the electronic device 100 may display, through the display 140, the first text 11 corresponding to the user voice obtained through the microphone 110, or the response provided based on the second text 12. To this end, the display 140 may include various types of display panels such as a liquid crystal display (LCD) panel, an organic light emitting diode (OLED) panel, a plasma display panel (PDP) panel, an inorganic light emitting diode (LED) panel and a micro LED panel, and is not limited thereto.

The display may include a touch panel. Accordingly, the display 140 may include a touch screen of the electronic device 100 together with the touch panel. In detail, the display 140 may include the touch screen implemented by forming a layer structure with the touch panel and the display 140 or forming the touch panel and the display 140 integrally with each other. Accordingly, the display 140 may function as an output for outputting information between the electronic device 100 and the user 1 and simultaneously, function as an input for providing the input interface between the electronic device 100 and the user.

The electronic device 100 may include the sensor 150. The sensor 150 may obtain various information on the electronic device 100 and the user of the electronic device 100. The processor 130 may obtain the user location information by the sensor 150 implemented as a global positioning system (GPS) sensor. However, the sensor 150 is not limited thereto, and may be any of various sensors such as a temperature sensor and a time of flight (ToF) sensor.

The electronic device 100 may obtain information input from the user through the input interface 160. For example, the electronic device 100 may obtain a user input related to the AI assistant of the electronic device 100 through the input interface 160 as the text instead of the user voice. To this end, the input interface 160 may be implemented as a plurality of keys, buttons, or a touch key or button on the touch screen.

The electronic device 100 may provide the response based on the second text 12 and the response based on the third text 13 through the speaker 170. To this end, information on a text-to-speech (TTS) engine may be stored in the memory 120. The processor 130 may convert the response expressed in the form of a text to a voice by the TTS engine and output the same through the speaker 170. The TTS engine may be a module for converting the text into the voice, and may convert the text into the voice by using various TTS algorithms which are conventionally disclosed.

The electronic device 100 may transmit and obtain various information by performing communication with various external devices through the communicator 180. In particular, according to an embodiment of the disclosure, the processor 130 may request or receive the information related to the user voice or the response on the user voice from the server 300 by the communicator 180. For example, the processor 130 may request the server 300 to search for or transmit the weather information by the communicator 180, and may receive the weather information to be obtained by the communicator 180.

To this end, the communicator 180 may include at least one of a short-range wireless communication module and a wireless local area network (LAN) communication module. The short-range wireless communication module may be a communication module that wirelessly performs data communication with the external device located in a short distance, and may be, for example, a Bluetooth module, a Zigbee module, a near field communication (NFC) module, an infrared communication module or the like. In addition, the wireless LAN communication module may be a module that is connected to an external network according to a wireless communication protocol such as Wifi or IEEE to communicate with an external server or the external device.

The diverse embodiments of the disclosure described above may be implemented in a computer or a computer readable recording medium using software, hardware, or a combination of software and hardware. In some cases, the embodiments described in the disclosure may be implemented by the processor itself. According to a software implementation, the embodiments such as procedures and functions described in the disclosure may be implemented by separate software modules. Each of the software modules may perform one or more functions and operations described in the disclosure.

Computer instructions for performing processing operations of the electronic device according to the diverse embodiments of the disclosure described above may be stored in a non-transitory computer-readable medium. The computer instructions stored in the non-transitory computer-readable medium may allow a specific device to perform the processing operations of the electronic device according to the diverse embodiments described above if based on the computer instructions are executed by a processor of the specific device.

The non-transitory computer-readable medium is not a medium that stores data for a while, such as a register, a cache, a memory or the like, but refers to a medium that semi-permanently stores data and is readable by the device. A specific example of the non-transitory computer-readable medium may include a compact disk (CD), a digital versatile disk (DVD), a hard disk, a Blu-ray disk, a universal serial bus (USB), a memory card, a read-only memory (ROM) or the like.

Although embodiments of the disclosure have been illustrated and described hereinabove, the disclosure is not limited to the abovementioned embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
a microphone;
a memory; and
a processor configured to:

obtain a first natural language understanding result for a first user voice obtained through the microphone based on a first text corresponding to the first user voice, provide a first response corresponding to the first user voice based on the first natural language understanding result, identify whether the first user voice comprises a tracking element based on the first natural language understanding result and a second text corresponding to the first response, based on identifying that the first user voice comprises the tracking element, store the first text, the first natural language understanding result and the second text in the memory, obtain a third text corresponding to the first response based on the first natural language understanding result, identify whether a changed element from the second text is included in the third text by comparing the second text with the third text, and based on identifying that the changed element is included in the third text, provide a second response corresponding to the first user voice, based on the third text.

2. The electronic device of claim 1, wherein the processor is further configured to identify that the first user voice comprises the tracking element based on a user intention included in the first user voice being to request information that is to be changed over time.

3. The electronic device of claim 2, wherein the processor is further configured to provide the first response by requesting a server to conduct a search corresponding to the first user voice, and identify that the first user voice comprises the tracking element based on a search result obtained from the server.

4. The electronic device of claim 1, wherein the processor is further configured to:

identify whether the first user voice comprises time information based on the first natural language understanding result, and based on identifying that the first user voice comprises the time information, obtain the third text until a time point corresponding to the time information after the first response is provided.

5. The electronic device of claim 1, wherein the processor further is configured to:

obtain a second natural language understanding result for the second text and a third natural language understanding result for the third text by inputting the second text and the third text to a natural language understanding model, and identify whether the changed element is included in the third text based on the obtained second natural language understanding result and the third natural language understanding result.

6. The electronic device of claim 1, wherein the processor is further configured to identify whether a context of a user that produces the first user voice corresponds to the third text at a time point when the first response is provided, and based on identifying that the context of the user corresponds to the third text at the time point when the first response is provided, provide the second response based on the third text.

7. The electronic device of claim 6, wherein the processor is further configured to:

based on identifying that the context of the user that produces the first user voice does not correspond to the third text, identify whether a second user voice of the user related to the first user voice is included in history information, the history information comprising information on the first user voice, information on the second user voice, and information on responses respectively corresponding to the first user voice and the second user voice, and based on identifying that the second user voice is included in the history information, provide the second response based on the third text.

8. A method for controlling an electronic device, the method comprising:

obtaining a first natural language understanding result for a first user voice based on a first text corresponding to the first user voice, providing a first response corresponding to the first user voice based on the first natural language understanding result;

identifying whether the first user voice comprises a tracking element based on the first natural language understanding result and a second text corresponding to the first response;

based on identifying that the first user voice comprises the tracking element, storing the first text, the first natural language understanding result and the second text;

obtaining a third text corresponding to the first response based on the first natural language understanding result;

identifying whether a changed element from the second text is included in the third text by comparing the second text with the third text; and based on identifying that the changed element is included in the third text, providing a second response corresponding to the first user voice and based on the third text.

9. The method of claim 8, wherein identifying whether the first user voice comprises the tracking element comprises identifying that a user intention included in the first user voice is to request information that is to be changed over time.

10. The method of claim 9, wherein identifying whether the first user voice comprises the tracking element further comprises:

requesting a server to search for the first user voice, and identifying that the first user voice comprises the tracking element based a search result obtained from the server.

11. The method of claim 8, wherein obtaining the third text comprises:

identifying whether the first user voice comprises time information based on the first natural language understanding result; and based on identifying that the first user voice comprises the time information, obtaining the third text until a time point corresponding to the time information after the first response is provided.

12. The method of claim 8, wherein identifying whether the changed element from the second text is included in the third text further comprises:

obtaining, a second natural language understanding result for the second text and a third natural language understanding result for the third text, and identifying whether the changed element is included in the third text based on the second natural language understanding result and the third natural language understanding result.

13. The method of claim 8, wherein providing the second response based on the third text comprises identifying whether a context of a user that produces the first user voice corresponds to the third text at a time point when the first response is provided, and
- wherein the method further comprises, based on identifying that the context of the user corresponds to the third text at the time point when the first response is provided, providing the second response based on the third text.

14. The method of claim 13, wherein providing the second response based on the third text comprises:
- based on identifying that the context of the user that produces the first user voice does not correspond to the third text, identifying whether a second user voice of the user related to the first user voice is included in history information, the history information comprising information on the first user voice, information on the second user voice, and information on responses respectively corresponding to the first user voice and the second user voice, and
- based on identifying that the second user voice is included in the history information, providing the second response based on the third text.

15. A non-transitory computer-readable storage medium storing instructions that, when executed by at least one processor, cause the at least one processor to:
- obtain a first natural language understanding result for a first user voice obtained through a microphone based on a first text corresponding to the first user voice,
- provide a first response corresponding to the first user voice based on the first natural language understanding result,
- obtain a third text corresponding to the first response based on the first natural language understanding result,
- identify whether a changed element from a second text is included in the third text by comparing the second text with the third text, and
- based on identifying that the changed element is included in the third text, provide a second response corresponding to the first user voice and based on the third text.

16. The storage medium of claim 15, wherein the instructions, when executed, further cause the at least one processor to identify that the first user voice comprises a tracking element based on a user intention included in the first user voice being to request information that is to be changed over time.

17. The storage medium of claim 16, wherein the instructions, when executed, further cause the at least one processor to:
- provide the first response by requesting a server to conduct a search corresponding to the first user voice, and
- identify that the first user voice comprises the tracking element based on a search result obtained from the server.

18. The storage medium of claim 15, wherein the instructions, when executed, further cause the at least one processor to:
- identify whether the first user voice comprises time information based on the first natural language understanding result, and
- based on identifying that the first user voice comprises the time information, obtain the third text until a time point corresponding to the time information after the first response is provided.

19. The storage medium of claim 15, wherein the instructions, when executed, further cause the at least one processor to:
- obtain a second natural language understanding result for the second text and a third natural language understanding result for the third text by inputting the second text and the third text to a natural language understanding model, and
- identify whether the changed element is included in the third text based on the obtained second natural language understanding result and the third natural language understanding result.

20. The storage medium of claim 15, wherein the instructions, when executed, further cause the at least one processor to:
- identify whether a context of a user that produces the first user voice corresponds to the third text at a time point when the first response is provided, and
- based on identifying that the context of the user corresponds to the third text at the time point when the first response is provided, provide the second response based on the third text.

* * * * *